(12) United States Patent
Riedel et al.

(10) Patent No.: US 9,611,040 B2
(45) Date of Patent: Apr. 4, 2017

(54) SEAT DEVICE COMPRISING IMPROVED AUDIO DEVICE FOR USE IN AN AIRCRAFT OR SPACECRAFT

(71) Applicant: AIRBUS OPERATIONS GMBH, Hamburg (DE)

(72) Inventors: Christian Riedel, Bliedersdorf (DE); Stefan Mahn, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 7 days.

(21) Appl. No.: 14/219,837

(22) Filed: Mar. 19, 2014

(65) Prior Publication Data
US 2014/0284976 A1  Sep. 25, 2014

Related U.S. Application Data

(63) Continuation of application No. PCT/EP2012/068106, filed on Sep. 14, 2012.
(Continued)

(30) Foreign Application Priority Data

Sep. 26, 2011 (DE) .................. 10 2011 083 444

(51) Int. Cl.
*A47C 7/62* (2006.01)
*A47C 31/00* (2006.01)
(Continued)

(52) U.S. Cl.
CPC .... *B64D 11/00154* (2014.12); *B64D 11/0015* (2013.01); *B64D 11/06* (2013.01);
(Continued)

(58) Field of Classification Search
CPC ..... B60N 2/48; B60N 2/4876; B60R 11/0217; B64D 11/00; B64D 11/0015;
(Continued)

(56) References Cited

U.S. PATENT DOCUMENTS 3,912,605 A * 10/1975 Nishio ................ C08C 19/40
522/102
4,042,791 A * 8/1977 Wiseman ............. B60N 2/4876
181/141
(Continued)

FOREIGN PATENT DOCUMENTS

DE    29518369 U1    1/1996
DE    20200526       4/2002
(Continued)

OTHER PUBLICATIONS

German Office Action for Appl. Serial No. 10 2011 083 444.3 dated Aug. 9, 2012.
(Continued)

*Primary Examiner* — Chi Q Nguyen
(74) *Attorney, Agent, or Firm* — Jenkins, Wilson, Taylor & Hunt, P.A.

(57) ABSTRACT

The present disclosure pertains to a seat device of an aircraft or spacecraft, having a seat which comprises a headrest, and a loudspeaker device which includes at least one pair of loudspeakers which are spaced apart from one another and located in the region of the headrest.

15 Claims, 3 Drawing Sheets

Related U.S. Application Data

(60) Provisional application No. 61/539,138, filed on Sep. 26, 2011.

(51) Int. Cl.
    *B64D 11/00*     (2006.01)
    *B64D 11/06*     (2006.01)
    *H04R 5/02*     (2006.01)
    *H04R 1/02*     (2006.01)
    *B60N 2/48*     (2006.01)
    *B60R 11/02*     (2006.01)
    *H04R 1/40*     (2006.01)

(52) U.S. Cl.
CPC ...... *B64D 11/0601* (2014.12); *B64D 11/0624* (2014.12); *B64D 11/0647* (2014.12); *H04R 1/02* (2013.01); *H04R 5/023* (2013.01); *B60N 2/48* (2013.01); *B60N 2/4876* (2013.01); *B60R 11/0217* (2013.01); *H04R 1/403* (2013.01); *H04R 2499/13* (2013.01)

(58) Field of Classification Search
CPC .......... B64D 11/00154; B64D 11/0624; H04R 1/403; H04R 1/026; H04R 2499/13
USPC ...................... 297/217.4, 391, 397
See application file for complete search history.

(56) References Cited

U.S. PATENT DOCUMENTS

| | | | | |
|---|---|---|---|---|
| 4,490,842 A * | 12/1984 | Watanabe | ............ | B60N 2/4876 181/156 |
| 4,977,600 A | 12/1990 | Ziegler | | |
| 5,133,017 A * | 7/1992 | Cain | ................. | G01R 33/3854 381/71.4 |
| 5,370,446 A * | 12/1994 | Bancod | .................... | A47C 7/38 297/220 |
| 5,387,026 A * | 2/1995 | Matsuhashi | .......... | B60N 2/4876 297/217.4 |
| 5,482,352 A * | 1/1996 | Leal | ......................... | B60N 2/28 297/188.01 |
| 5,624,156 A * | 4/1997 | Leal | ......................... | A47C 7/72 297/217.3 |
| 5,807,177 A * | 9/1998 | Takemoto | ................. | A47C 7/72 273/148 B |
| 6,089,663 A * | 7/2000 | Hill | ......................... | A47C 3/029 297/170 |
| 6,135,551 A * | 10/2000 | Linder | .................... | A47C 7/72 297/217.4 |
| 6,744,898 B1 * | 6/2004 | Hirano | ................... | H04R 5/023 381/301 |
| 7,676,047 B2 * | 3/2010 | Aylward | ................ | H03G 5/165 381/342 |
| 7,941,139 B2 | 5/2011 | Reitmann et al. | | |
| 8,007,043 B1 * | 8/2011 | Vuong | ..................... | B60N 2/28 297/217.3 |
| 8,090,116 B2 * | 1/2012 | Holmi | ..................... | H04R 5/02 381/1 |
| 8,164,215 B2 | 4/2012 | Bauer et al. | | |
| 8,295,535 B2 | 10/2012 | Tracy | | |
| 2007/0116298 A1 * | 5/2007 | Holmi | ..................... | H04R 5/02 381/86 |
| 2008/0037794 A1 * | 2/2008 | Sugawara | ............... | H04R 5/023 381/1 |
| 2011/0081038 A1 | 4/2011 | Tracy | | |

FOREIGN PATENT DOCUMENTS

| | | |
|---|---|---|
| DE | 102005058826 A1 | 6/2007 |
| DE | 102006031010 A1 | 1/2008 |
| DE | 102008024217 A1 | 12/2009 |
| EP | 2213503 A1 | 8/2010 |
| GB | 2224178 A | 4/1990 |
| JP | 5345549 A | 12/1993 |
| WO | WO 2006/084877 A2 | 8/2006 |
| WO | WO 2007065941 A1 | 6/2007 |
| WO | WO 2013/045293 A1 | 4/2013 |

OTHER PUBLICATIONS

International Search Report and Written Opinion for Application No. PCT/EP2012/068106 dated Feb. 27, 2013.

* cited by examiner

SEAT DEVICE COMPRISING IMPROVED AUDIO DEVICE FOR USE IN AN AIRCRAFT OR SPACECRAFT

CROSS-REFERENCES TO RELATED APPLICATIONS

This application is a continuation of and claims priority to PCT/EP2012/068106, filed Sep. 14, 2012, which claims the benefit of and priority to U.S. provisional application No. 61/539,138, filed Sep. 26, 2011, and German patent application No. 10 2011 083 444.3, filed Sep. 26, 2011, the entire disclosures of which are incorporated herein by reference.

TECHNICAL FIELD

The present invention relates to a seat device comprising an improved audio device for an aircraft or spacecraft.

Although it may be applied to any seat devices in an aircraft or spacecraft, the present invention and the underlying problems are described in detail with respect to an aircraft.

BACKGROUND

If a passenger wants to listen to music or the sound on a video film provided by a so-called in-flight entertainment system (IFE), for example, he merely has the option to connect and wear headphones. This can become very uncomfortable over time, especially on long flights, as the headphones usually used for the IFE system are not particularly comfortable to wear.

However, the passenger is unable to use headphones which he has brought with him, as the headphone sockets in an aircraft have a special standard. This is due to the fact that headphones brought by the passenger have very different impedance values, which means that the headphones either issue sounds which are too quiet or even much too loud. For this reason, standardised headphones are often distributed by the cabin crew. However, when these are used multiple times, this leads to corresponding expense to clean and service the headphones.

If single-use headphones are used instead, this leads to a considerable quantity of waste.

Document DE 10 2008 024 217 A1 describes a system for contact-free data and energy transmission between two components which is configured to produce an alternating voltage at the signal output on a transmitter by means of frequency modulation from an electrical voltage applied to the voltage input, and to subsequently demodulate accordingly at the receiver side. However, the use of such a system is restricted to cases in which there are small distances between the transmitter and the receiver, and also requires the use of headphones with the transmitter to convert the received signals into a sound signal for the passenger.

Document DE 10 2006 031 010 A1 describes a method and a device for transmitting data which is configured such that both the transmitter and the receiver communicate with each other at an operating frequency in excess of 30 GHz, so as to reduce the radiation intensity experienced by a passenger. However, this system also requires the use of headphones with the receiver to convert the received signals into a sound signal for the passenger.

SUMMARY

One idea of the present invention is to create a seat device for an aircraft or spacecraft which provides a passenger with audio signals without these audio signals being perceptible to adjacent passengers. In addition, the use of the headphones required in previous cases should not be necessary.

Accordingly a seat device is provided which comprises a seat and a pair of loudspeakers which are arranged and controlled so as to create a listening region in the direction of the passenger, whilst the audio signals are suppressed at each side adjacent to the listening region by interference.

One concept underlying the present invention is that different acoustic regions can selectively be created using interference from superposed signals and the amplification and suppression of superposed signals in these acoustic regions can advantageously be used to provide audio signals in a locally restricted listening region. This region may correspond to at least the region in which the passenger's head is intended to be positioned. The listening region may also extend in the direction of the adjacent seat in the passenger's direction of vision, with the result that the listening region substantially covers the entire region between the two associated headrests.

One advantage of the present invention is that the passenger is able to hear audio signals from the IFE system or from an entertainment device which he has brought with him at his seat, whilst adjacent passengers cannot hear these audio signals and thus each passenger can hear the selected music channel or the audio signals from a video film without any disruptive influences, despite the small distance from the adjacent passenger's seat (especially at the sides).

The formation of the respectively adjacent listening and suppression regions in the passenger's head region, which have very different acoustic properties, advantageously means that it is no longer necessary to use headphones to provide individual audio signals for each passenger, as was always the case previously.

At the same time, passenger comfort is increased by eliminating headphones and the time-consuming process of issuing and collecting headphones is no longer necessary. The costs of manufacturing headphones can also be saved.

In addition, the present invention advantageously permits the desired audio signals to be transmitted wirelessly from a transmitter to the loudspeaker device, and this is particularly convenient for the passenger if he receives the desired audio signals from his own entertainment device which may, for example, be attached to the seat in front.

Some advantageous embodiments and improvements of the invention are described in the subclaims.

According to one embodiment, the pair of loudspeakers is positioned at the sides of a passenger's head and inclined towards the passenger's head in such a way that the pair of loudspeakers transmits signals towards a region in which the passenger's head is intended to be positioned, in this case particularly in the rear region of the seat. In an equivalent alternative, the pair of loudspeakers may transmit signals towards a region in which the passenger's head is intended to be positioned, i.e. in the region in front of the headrest.

According to a further embodiment, the seat device comprises a control device which is designed to control the pair of loudspeakers such that the signals emitted by the loudspeakers are audible in a listening region in which the passenger's head is intended to be positioned. The present seat device can thus produce a listening region in which the signals emitted by the pair of loudspeakers are amplified by interference such that the signals issued by the pair of loudspeakers only need to be provided with a low transmission power.

According to a further embodiment, the control device is designed to control the pair of loudspeakers so as to create, adjacent to the listening region, a suppression region in which the signals emitted by the pair of loudspeakers are not audible. The suppression region is particularly advantageous in an aircraft situation as other passengers sitting at the sides of the passenger thus cannot hear the signals emitted by the pair of loudspeakers, with the result that each passenger can receive the individual audio signals he wishes to hear from different entertainment systems or music channels, without the people in the adjacent seats being able to hear these signals. The transition region between the listening region and the suppression region is also not sudden, but steady. It is not necessary for all signals to be suppressed in the suppression region; on the contrary, it is entirely sufficient if there are particular differences in volume compared with the listening region such that a person is able to hear only the louder sound source.

According to a further embodiment, the loudspeaker device can be connected to the seat headrest by means of a cover. This makes it possible to retrofit an existing seat device with a loudspeaker device as described here at little expense.

According to a further embodiment, the loudspeaker device is designed as an integral part of the seat. In this case, when refitting an aircraft, the present seat device can already be equipped with the improved audio device, with which it is also no longer necessary to use the headphones which were previously required.

According to a further embodiment, a second seat is also provided which is located next to the seat, a second pair of loudspeakers being arranged on the second seat at the side of the passenger's head and inclined in the direction of the passenger's head in such a way that the second pair of loudspeakers transmits signals towards the region in which the passenger's head is intended to be positioned. This configuration makes it possible to create an audio device with surround sound with which the passenger can obtain an improved sound experience.

According to a further embodiment, a detection unit for detecting whether a seat is occupied is provided and interrupts the creation of the listening region as soon as the detection unit detects that the seat is not occupied. In an equivalent alternative, the creation of the listening region is interrupted if the detection unit detects that the second seat in the seat device is unoccupied. This interruption is intended to prevent the creation of the listening region if the seat position is unoccupied, as in this case the reproduction characteristics of the audio signals transmitted by the loudspeaker device are different from those when the seat position is occupied.

According to a further embodiment, the second seat comprises a second control device which is designed to control the second pair of loudspeakers such that the signals emitted by these loudspeakers are audible in a second listening region in which the passenger's head is intended to be positioned.

According to a further embodiment, the second pair of loudspeakers can be connected in the region of the headrest of the second seat by means of a cover. The present loudspeaker device can thus also be retrofitted to the second seat.

According to a further embodiment, audio signals are provided to the pair of loudspeakers by an electronic device which is supplied by the passenger. In an even more preferable scenario, audio signals are provided to the pair and/or second pair of loudspeakers wirelessly by the electronic device. Wiring of the aircraft seat can thus be advantageously omitted. In addition, the passengers can watch their own multimedia content during the flight on the mobile entertainment devices which have now become widespread. The electronic device provided by the passenger can be positioned on the seat.

A cover for an aircraft or spacecraft includes a loudspeaker device which comprises at least one pair of loudspeakers which are spaced apart from one another and located in the region of a headrest which can be connected to the cover. The cover has substantially the same benefits as the seat device described above. In addition, an existing seat device can be retrofitted with the present cover with minimal financial and technical expenditure.

According to another embodiment of the invention, the pair of loudspeakers is positioned at the sides of a passenger's head and inclined towards the passenger's head in such a way that the pair of loudspeakers transmits signals towards a region in which the passenger's head is intended to be positioned.

According to a further embodiment, the cover comprises a control device which is designed to control the pair of loudspeakers such that the signals emitted by the loudspeakers are audible in a listening region in which the passenger's head is intended to be positioned.

According to a further embodiment, the control device is designed to control the pair of loudspeakers so as to create a suppression region adjacent to the listening region, the signals emitted by the pair of loudspeakers not being audible in this suppression region.

In addition, an aircraft or spacecraft comprises a seat device and/or cover according to the present disclosure.

BRIEF DESCRIPTION OF THE DRAWINGS

The invention is described below in greater detail with the aid of embodiments and with reference to the attached figures of the drawings.

The figures show.

In the figures, the same reference numerals refer to the same components or components with the same function, unless otherwise specified.

DETAILED DESCRIPTION

Figure 1:
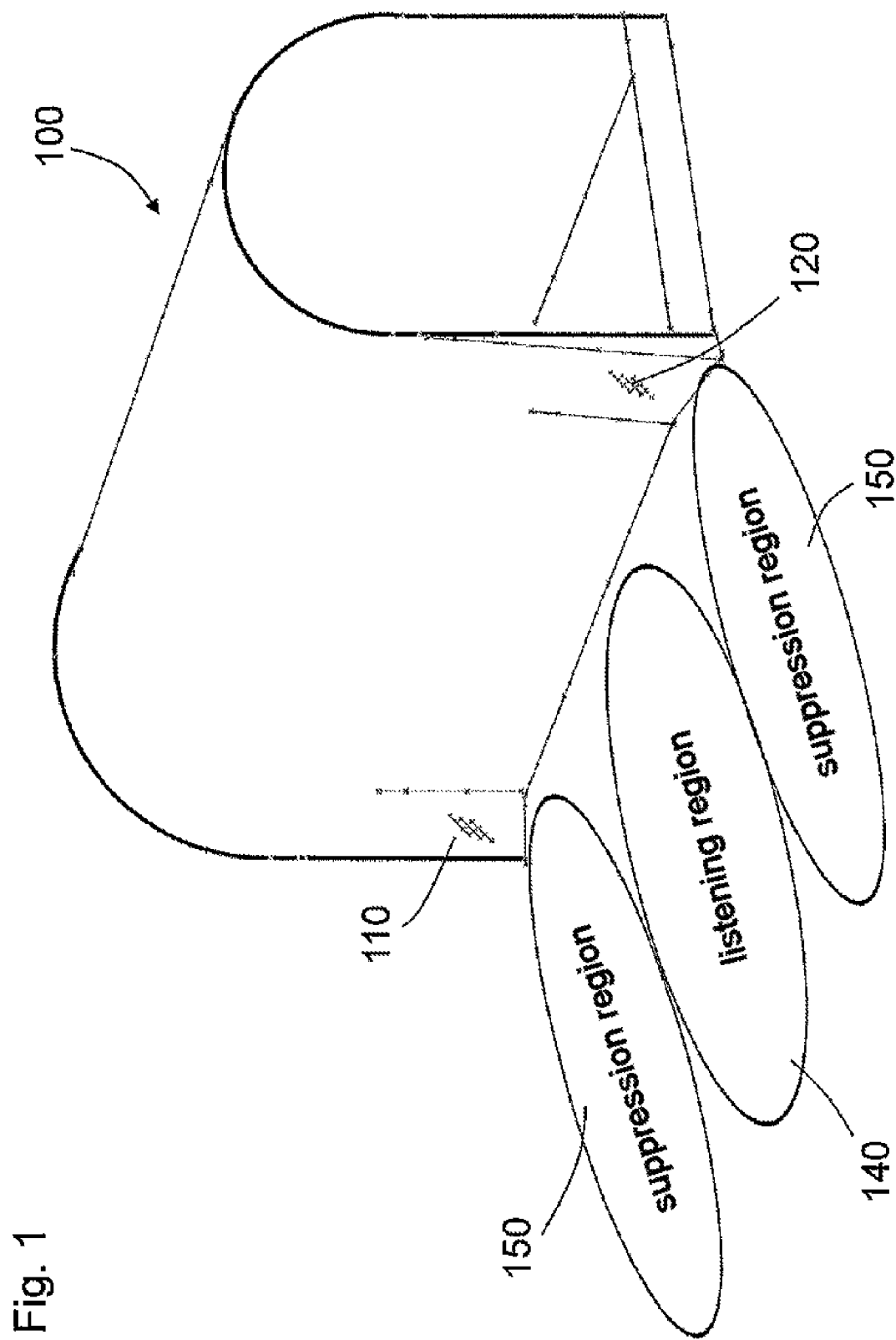
FIG. 1 a schematic perspective view of the resulting separate acoustic regions when using two loudspeakers in a cover according to the present invention.

FIG. 1 shows a schematic perspective view of resulting separate acoustic regions when using two loudspeakers 110, 120 which are in this case each arranged in the region of a longitudinal end on one side of a cover 100, which is intended for use on a seat (not illustrated) of a present seat device (not illustrated).

The cover 100 is in this case formed from a material which is substantially without inherent rigidity, with the result that the cover 100 may be connected to a portion of the seat device by being placed over this portion, the cover 100 then substantially assuming the form of the connection region, in this case specifically the headrest, with the seat.

The cover 100 comprises a device for holding an entertainment device (not illustrated), which may be a passenger's personal device, which in this case may be a so-called commercial off-the-shelf device (COTS device), i.e. a commercially available device.

In this case the loudspeakers 110, 120 are arranged along one side of the cover 100, spaced apart from one another so as to create, starting from the loudspeakers 110, 120, a listening region 140 having a pre-defined width and a pre-defined length, and a suppression region 150, adjacent on each side of the listening region 140, the listening region being located in a region in which the passenger's head is intended to be positioned. Both the listening region 140 and the suppression region 150 each extend in the direction of a passenger (not illustrated) sitting at a distance from the loudspeakers 110, 120. The emission properties of the two loudspeakers 110, 120 are in each case selected such that the listening region 140 extends sufficiently far substantially in the longitudinal direction towards the passenger to ensure that the passenger's head is fully in the listening region 140, but the listening region 140 ends within the seat region, so that a passenger sitting behind the passenger cannot discern the listening region 140. The suppression region 150 in each case extends over a sufficient width to ensure that a person sitting at the side of the passenger also cannot discern the listening region 140.

Figure 2:
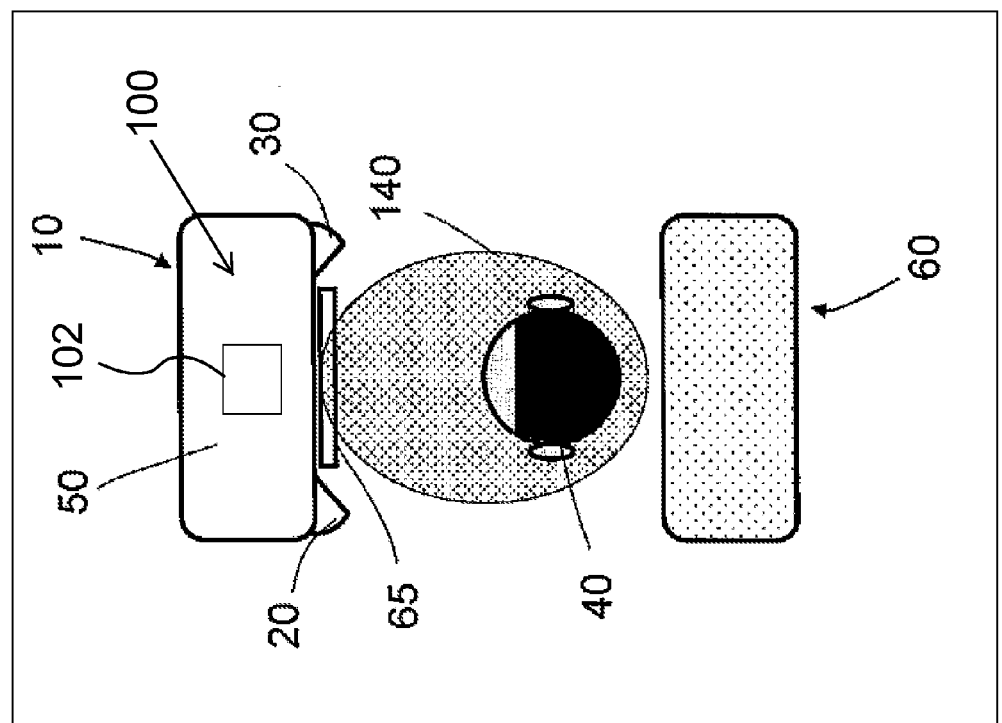
FIG. 2 a plan view of a seat device comprising a pair of loudspeakers according to the present invention.

FIG. 2 shows a plan view of a seat device in an aircraft or spacecraft, generally designated A, comprising a pair of loudspeakers according to the present invention. The seat device comprises a first seat 10 having a headrest 50. A loudspeaker device is provided which comprises at least one pair of loudspeakers 20, 30 which are spaced apart from one another and located in the region of the headrest 50. The loudspeaker device is connected to the headrest 50 of the seat 10 by a cover 100. In an equivalent alternative, the loudspeaker device is designed as an integral part of the seat 10.

An electronic (entertainment) device 65 which the passenger has himself provided is located in the region of the rear of the seat 10. In an equivalent alternative, the IFE system may also provide the audio signals for transmission to the passenger.

The cover 100 comprises a control device generally designated 102 which is designed to control the pair of loudspeakers 20, 30 such that the signals emitted by the loudspeakers are audible in a listening region 140 in which the passenger's head 40 is intended to be positioned. In this case the passenger, and thus his head 40, is located in the rear region of the seat 10, as the passenger has taken up his position on a second seat 60. The control device 102 is also designed to control the pair of loudspeakers 20, 30 so as to create a suppression region (see, e.g., 150, FIG. 1) adjacent to the listening region 140, the signals emitted by the pair of loudspeakers 20, 30 not being audible in this suppression region.

Figure 3:
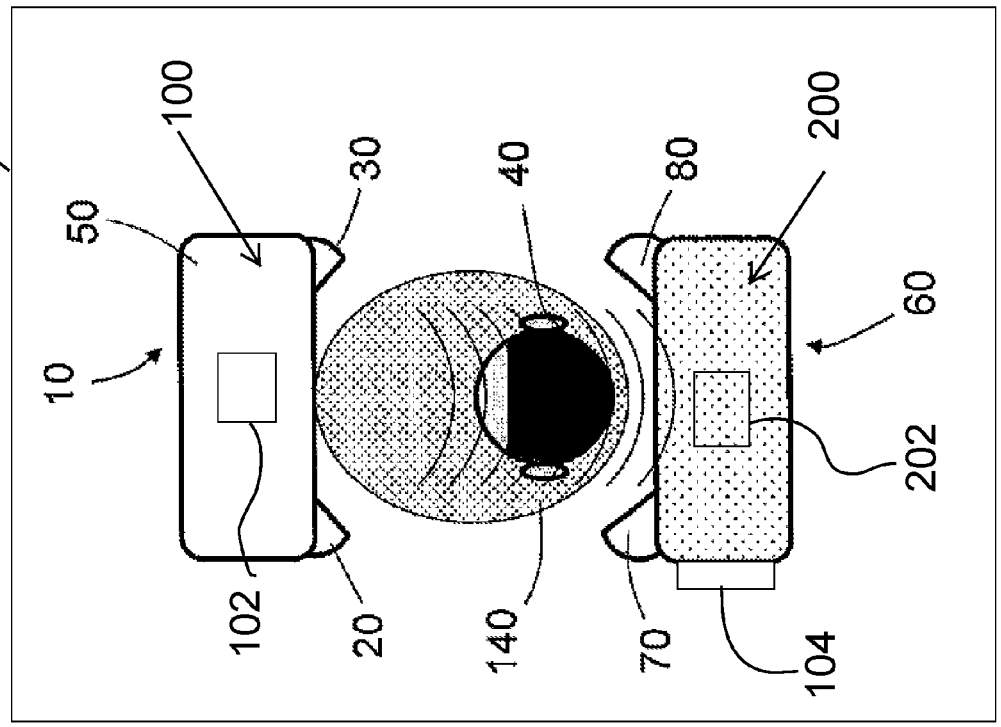
FIG. 3 a plan view of a further seat device for implementing a loudspeaker device for surround sound with wireless transmission of the additional audio signals according to the present invention.

FIG. 3 shows a plan view of a further seat device in an aircraft or spacecraft, generally designated A, for implementing a loudspeaker device for surround sound with wireless transmission of the additional audio signals for the surround sound according to the present invention. The seat device comprises a first seat 10 having a headrest 50. A loudspeaker device is provided which comprises at least one pair of loudspeakers 20, 30 which are spaced apart from one another and located in the region of the headrest 50. The loudspeaker device is connected to the headrest 50 of the seat 10 by a cover 100. In an equivalent alternative, the loudspeaker device is again designed as an integral part of the seat 10.

The cover 100 comprises a control device generally designated 102 which is designed to control the pair of loudspeakers 20, 30 such that the signals emitted by the loudspeakers are audible in a listening region 140 in which the passenger's head 40 is intended to be positioned. In this case the passenger, and thus his head 40, is located in the rear region of the seat 10, as the passenger has taken up his position on a second seat 60. The control device 102 is also designed to control the pair of loudspeakers 20, 30 so as to create a suppression region (see, e.g., 150, FIG. 1) adjacent to the listening region 140, the signals emitted by the pair of loudspeakers 20, 30 not being audible in this suppression region.

In addition, a second loudspeaker device is provided on the second seat 60 and comprises a pair of loudspeakers 70, 80 which are spaced apart from one another and located in the region of the headrest of the second seat 60. The second loudspeaker device is connected to the headrest 50 of the second seat 60 by a second cover 200. In an equivalent alternative, the second loudspeaker device is again designed as an integral part of the second seat 60. A second control device generally designated 202 is also arranged such that it is able to receive additional audio signals for implementing a surround sound system for the passenger and transmit these towards the passenger via the second loudspeakers 70, 80. The additional audio signals may be such that it is possible for stereo sound to be output via the second loudspeakers 70, 80. The additional audio signals may be transmitted wirelessly to the second control device 202.

Although the present invention has been described herein by means of preferred embodiments, it is not limited to these embodiments, but may be modified in multiple ways.

For example, a detection unit generally designated 104 for detecting whether the seat is occupied may be provided. If the detection unit 104 detects that the seat suddenly becomes unoccupied during the reproduction of audio signals, the detection unit 104 instructs the transmitter of the audio signals to interrupt transmission of the audio signals until the detection unit 104 once again detects that the seat is occupied.

Figure 4:
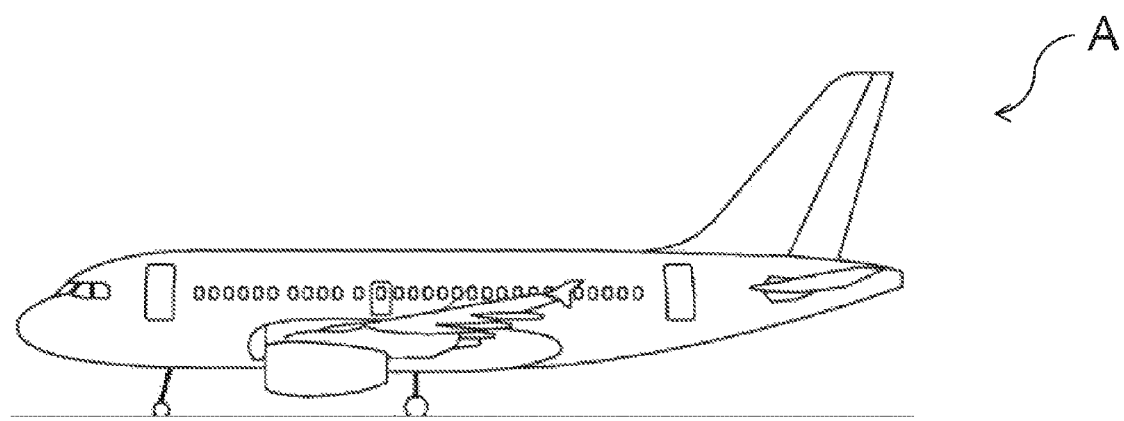
FIG. 4 a side view of an exemplary aircraft or spacecraft comprising a seat device according to the present invention.

FIG. 4 is a side view illustrating an exemplary aircraft or spacecraft A according to an embodiment of the subject matter described herein. Aircraft or spacecraft A comprises a seat device which comprises a headrest and a cover comprising a loudspeaker device which comprises at least one pair of loudspeakers which are spaced apart from one another and located in the region of the headrest which can be connected to the cover.

What is claimed is:

1. A seat system of an aircraft or spacecraft, the seat system comprising:
    a first seat which comprises a headrest, a front side of the headrest being adapted to support a head of a first passenger and a rear side of the headrest being oriented toward a second seat located behind the first seat; and
    a loudspeaker device which comprises at least one pair of loudspeakers which are spaced apart from one another and arranged at the rear side of the headrest of the first seat, wherein the loudspeaker device is adapted to emit signals that are audible in a listening region in which a head of a second passenger seated in the second seat is positioned.

2. The seat system according to claim 1, wherein the pair of loudspeakers is located at the sides of the passenger's head and inclined towards the passenger's head in such a way that the pair of loudspeakers transmits signals towards a region in which the passenger's head is intended to be positioned.

3. The seat system according to claim 1, wherein the seat system comprises a control device which is designed to control the pair of loudspeakers such that the signals emitted by the loudspeakers are audible in a listening region in which the passenger's head is intended to be positioned.

4. The seat system according to claim 1, wherein the control device is designed to control the pair of loudspeakers so as to create a suppression region adjacent to the listening region, the signals emitted by the pair of loudspeakers not being audible in this suppression region.

5. The seat system according to claim 1, wherein the loudspeaker device is connected to the headrest of the first seat by a cover.

6. The seat system according to claim 1, wherein the loudspeaker device is designed as an integral part of the first seat.

7. The seat system according to claim 1, wherein a second pair of loudspeakers is located on the second seat at the sides of the passenger's head and inclined towards the passenger's head in such a way that the second pair of loudspeakers transmits signals towards the region in which the passenger's head is intended to be positioned.

8. The seat system according to claim 7, wherein the second pair of loudspeakers is connected in the region of the headrest of the second seat by a cover.

9. The seat system according to claim 1, wherein audio signals are provided to the pair of loudspeakers by an electronic device which is supplied by the passenger.

10. The seat system according to claim 1, wherein a detection unit for detecting whether a seat position is occupied is provided and interrupts a production of the listening region as soon as the detection unit detects that the first seat is not occupied.

11. A cover of an aircraft or spacecraft, the cover comprising:
a loudspeaker device according to claim 1, which is connected to the cover.

12. The cover according to claim 11, wherein the pair of loudspeakers is located at the sides of the passenger's head and inclined towards the passenger's head in such a way that the pair of loudspeakers transmits signals towards a region in which the passenger's head is intended to be positioned.

13. The cover according to claim 11, wherein the cover comprises a control device which is designed to control the pair of loudspeakers such that the signals emitted by the loudspeakers are audible in a listening region in which the passenger's head is intended to be positioned.

14. The cover according to claim 13, wherein the control device is designed to control the pair of loudspeakers so as to create a suppression region adjacent to the listening region, the signals emitted by the pair of loudspeakers not being audible in this suppression region.

15. An aircraft or spacecraft comprising:
a seat device comprising:
a seat which comprises a headrest; and
a cover comprising a loudspeaker device according to claim 1.

* * * * *